F. C. PRINDLE.
TILTING STEERING WHEEL FOR MOTOR VEHICLES.
APPLICATION FILED MAY 19, 1913.
1,098,301.
Patented May 26, 1914.
2 SHEETS—SHEET 1.
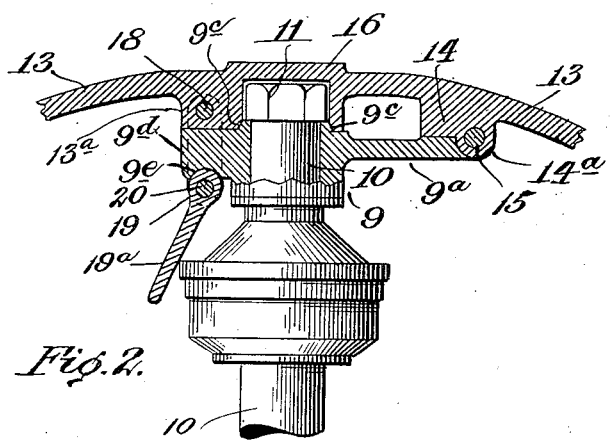
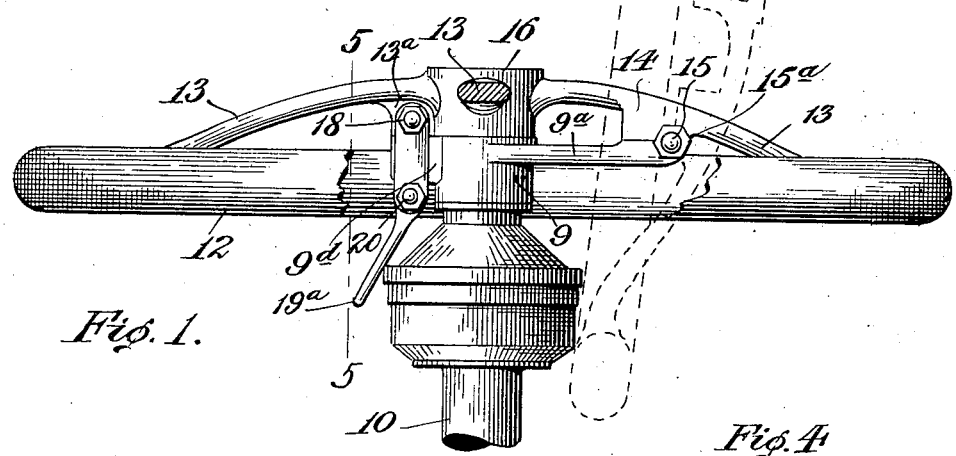
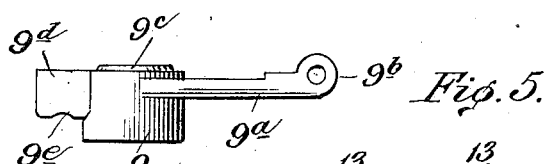
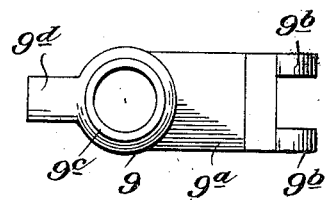
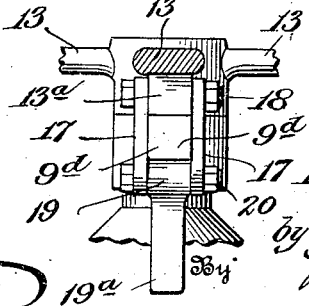
Witnesses:
T. C. Beall
W. T. S. Duvall
Inventor:
Franklin C. Prindle,
By W. S. Duvall
Attorney.

F. C. PRINDLE.
TILTING STEERING WHEEL FOR MOTOR VEHICLES.
APPLICATION FILED MAY 19, 1913.

1,098,301.

Patented May 26, 1914.

2 SHEETS—SHEET 2.

Witnesses:

Inventor:
Franklin C. Prindle,
By
Attorney.

UNITED STATES PATENT OFFICE.

FRANKLIN C. PRINDLE, OF WASHINGTON, DISTRICT OF COLUMBIA.

TILTING STEERING-WHEEL FOR MOTOR-VEHICLES.  REISSUED

1,098,301. Specification of Letters Patent. Patented May 26, 1914.

Application filed May 19, 1913. Serial No. 768,560.

*To all whom it may concern:*

Be it known that I, FRANKLIN C. PRINDLE, a citizen of the United States, residing in the city of Washington, District of Columbia, have invented a Tilting Steering-Wheel for Motor-Vehicles, of which the following is a full and complete specification.

In the construction and arrangement of that particular type of steering-mechanism for motor-vehicles or automobiles employing a steering-wheel, the latter is usually disposed in close proximity to the seat, to be within easy reach of the operator for steering the vehicle, but when so disposed is in the way of the operator getting on or off the seat, practically necessitating the employment of some means by which the steering-wheel may be shifted or tilted out of the way temporarily.

In the present instance I accomplish the tilting of the steering-wheel by means of a peculiar form of hinge-connection and locking device, and the primary object of my invention is to provide an improved hinge-connection and locking device of simple construction for convenient manipulation, and also strong and durable to insure a proper operation of the steering mechanism when the wheel is in locked engagement with the post.

Other objects and advantages of the invention will hereinafter appear, and what I claim as new and desire to secure by Letters-Patent is specifically pointed out in the appended claim.

Figure 7:
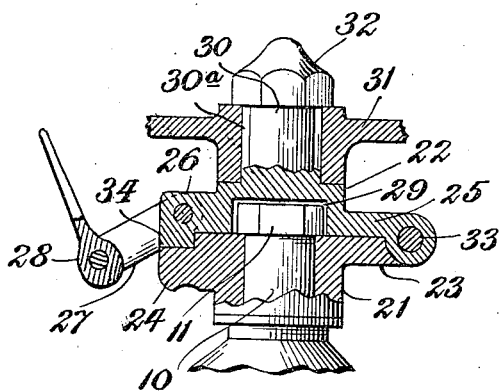
Figure 6:
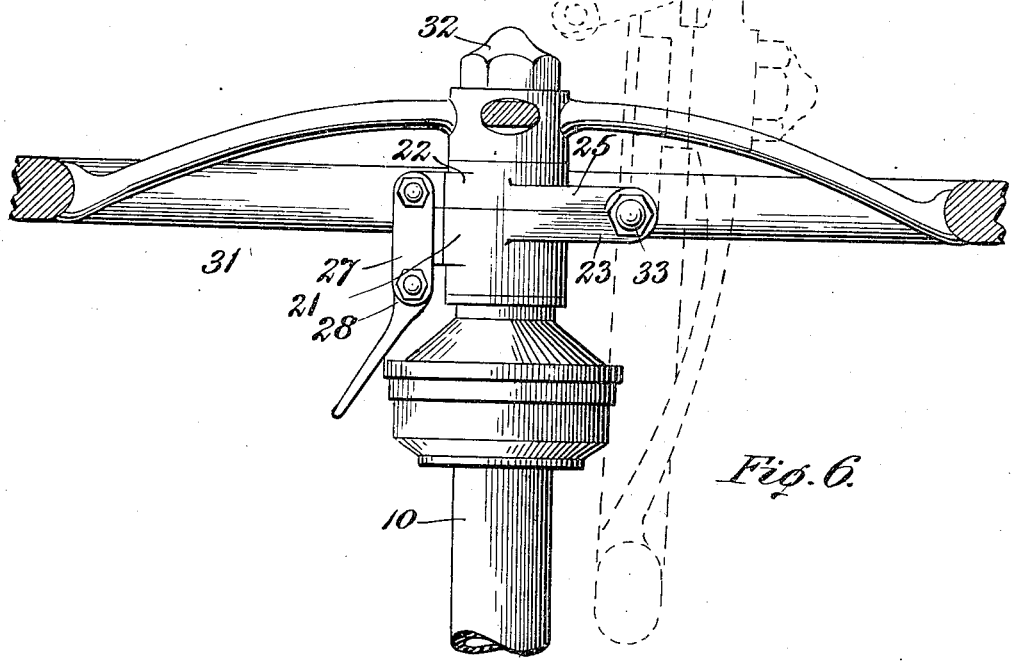

In the accompanying drawings, forming a part hereof—Figure 1 is a side elevation of the steering-wheel and post of a steering-mechanism for motor-vehicles, part of the wheel being broken away to show the hinge-connection and locking device. Fig. 2 is a detail sectional view through the hinge-connection and locking device. Figs. 3 and 4 are detail views of one member of the hinge connection. Fig. 5 is a detail sectional view on the line 5—5 of Fig. 1. Fig. 6 is a view illustrating a modification of the invention, and Fig. 7 is a sectional view of the same.

At the outset it will be understood that my invention is applicable to that type of steering-mechanism in which the spark and throttle levers are located below the steering-wheel, thereby not interfering with the tilting movement of the wheel, such an arrangement being common to that type of automobile known as the "Ford," to which my invention is particularly adapted; although of course it may be applied to any type of steering-mechanism permitting a tilting movement of the wheel away from the upper end of the post.

In carrying out my invention I provide as one of the elements a hinge-member 9, which is fixedly attached to the upper end of the steering-post 10 by the usual head-nut 11, said hinge-member having a projecting arm $9^a$ for the pivotal connection thereto of the steering-wheel 12, and a lug $9^d$ at the opposite side thereof from said arm. In the preferred form of construction, shown in Figs. 1 to 5 of the drawings, the other part of the hinge is formed by one of the spokes, 13, of the steering-wheel, and for this purpose said spoke is provided with a boss 14 having an ear $14^a$ coöperating with companion ears $9^b$, $9^b$, on the hinge-member 9, to receive a pivot-bolt 15, upon which the wheel may be swung or tilted to a position at one side of the steering-post, as indicated in dotted lines in Fig. 1. In order to securely fasten the bolt, without binding the ears, the outer end of the bolt is threaded through one of the ears $9^b$, and the nut, $15^a$, threaded on the projecting end to jam against said ear, as will be understood.

In the present instance the steering-post 10 does not pass through the hub 16 of the steering-wheel, but said hub is simply recessed at its underside to form a socket for the reception of the head-nut 11, by which the hinge-member is secured to the steering-post, as hereinbefore stated. The socket is preferably beveled at its outer end, as shown in the drawings, (Fig. 2), so as to snugly seat on a boss $9^c$ formed on the upper side of the hinge-member 9, and prevent play or rattling of the parts. For the same purpose a short boss 14 is formed on the spoke of the wheel, and the meeting faces of the hinge-arm and said boss fit closely together when the parts of the hinge-connection are locked together in the manner which I shall now proceed to describe.

Swingingly connected to a boss $13^a$ on the spoke and hub of the wheel at the opposite side of said hub from the spoke having the boss 14, are links 17, 17, adapted to embrace the lug $9^d$ on the hinge-member 9, so that a cam, 19, pivoted between the lower ends of said links may engage in a recess $9^e$ at the underside of the aforesaid lug $9^d$, whereby the parts of the hinge-connection, that is to say, the hinge-member 9 and the wheel, may be clamped firmly and securely together. The cam is provided with a lever 19$^a$, and is pivoted between the ends of the links on a bolt 20, the links being swingingly connected to the boss 13$^a$ by a bolt 18.

By employing the peculiar form of hinge-connection hereinbefore described the wheel will be securely and firmly connected to the upper end of the steering-wheel when the parts are locked together, so that the wheel may be operated in the usual manner for steering the vehicle. Now when it is desired to tilt the wheel so that it will be out of the way of the operator getting on or off the seat it is only necessary to swing the cam out of engagement with the recess at the underside of the lug 9$^d$ and beyond said lug.

In some instances I may provide two similar hinge-members, 21 and 22, as shown in the modification Figs. 6 and 7, in which the member 21 is provided with a short arm, 23 opposite the locking lug 24, and the hinge-member 22 provided with a similar short arm, 25, and opposite locking-lug 26, coöperating with the lug 24, the links, as 27, 27, being in this instance pivoted to the lug 26 and adapted to embrace the lug 24, for engagement of the cam 28 with the recess at the underside of the last-mentioned lug. In this instance, also, the hinge-member 22 is provided with a socket, 29, to receive the head-nut 11 by which the member 21 is secured to the upper end of the steering-post 10, and with an upwardly-projecting stud 30 to receive the steering-wheel 31, secured thereon by a cap-nut 32. To prevent the wheel turning on the stud the latter is provided with splines 30$^a$, and to relieve the hinge-members 21 and 22 from lateral movement or strain on the pintle or bolt 33, one of said hinge-members, as 22, is provided with a tongue, 34, seating in a corresponding recess in the other hinge-member, as shown in Fig. 7. It will be noted that in the modification provision is made for tilting the steering-wheel in a similar manner to that shown in the other figures of the drawings, but in this instance the construction of the wheel need not be modified, and will fit on the upper end of the stud 30 in the same manner that it fits on the upper end of the steering-post; in other words, the hinge-member 21 takes the place of the steering-wheel, and the stud 30 provides for the attachment of the wheel to the hinge-connection; and therefore this form of hinge-connection may be produced as a separate article of manufacture.

Having described my invention, I claim:—

In a steering mechanism for motor-vehicles, the combination with the steering-post, of a hinge-member on the upper end thereof having a pivot-arm and locking lugs at opposite sides, the upper edge of the locking-lug being flush with the upper outer edge of said hinge-member and said locking-lug having plain sides forming bearing surfaces and at its underside, a recess, a nut threaded on the upper end of the post to secure the hinge member thereon, a hand-wheel pivoted to the outer end of the pivot-arm and having a recess or socket in its hub to receive the aforesaid nut, and a lug on the hand-wheel of the same width as the locking-lug on the hinge-member and adapted to impinge thereagainst; together with links pivoted to the sides of the lug on the hand-wheel to closely embrace the sides of the companion lug on the hinge-member and depend below the same, and a cam pivoted between the ends of the links to engage the aforesaid recess in the locking-lug, substantially as shown and described.

In testimony whereof I have signed my name to this specification in the presence of two subscribing witnesses.

FRANKLIN C. PRINDLE.

In the presence of—
  W. S. DUVALL,
  H. S. BEALL.